United States Patent
Ney

(10) Patent No.: US 8,218,000 B2
(45) Date of Patent: Jul. 10, 2012

(54) METHOD AND SYSTEM FOR SIZE CALIBRATION

(75) Inventor: Christophe Ney, Birmensdorf (CH)

(73) Assignee: Leica Instruments (Singapore) Pte. Ltd., Singapore (SG)

(*) Notice: Subject to any disclaimer, the term of this patent is extended or adjusted under 35 U.S.C. 154(b) by 1835 days.

(21) Appl. No.: 11/078,081

(22) Filed: Mar. 11, 2005

(65) Prior Publication Data

US 2005/0157953 A1    Jul. 21, 2005

Related U.S. Application Data

(63) Continuation of application No. PCT/EP03/10013, filed on Sep. 9, 2003.

(30) Foreign Application Priority Data

Sep. 13, 2002  (DE) .................................. 102 42 628

(51) Int. Cl.
*H04N 9/47* (2006.01)
*H04N 7/18* (2006.01)
(52) U.S. Cl. ......................................................... 348/80
(58) Field of Classification Search ..................... 348/80
See application file for complete search history.

(56) References Cited

U.S. PATENT DOCUMENTS

| 3,947,130 | A | 3/1976 | Procter |
| 5,519,216 | A * | 5/1996 | Benner et al. ............... 250/311 |
| 6,137,893 | A | 10/2000 | Michael et al. |
| 6,781,630 | B2 | 8/2004 | Nomura et al. |
| 2001/0028391 | A1 | 10/2001 | Iko |

FOREIGN PATENT DOCUMENTS

| JP | 60-125502 | 7/1985 |
| JP | 2002-213921 A | 7/2002 |

OTHER PUBLICATIONS

Machine Translation of JP2002-213921.*

* cited by examiner

*Primary Examiner* — Mehrdad Dastouri
*Assistant Examiner* — Jeremaiah Hallenbeck-Huber
(74) *Attorney, Agent, or Firm* — Hodgson Russ LLP

(57) ABSTRACT

A method and system for size calibration of an electronically generated image of a specimen that is generated by an optical instrument having a downstream digital camera operable in different reproduction modes is disclosed. In order to enhance image analysis reliability and decrease access times, it is proposed that firstly, for a specified reproduction mode of the camera, a reference calibration value indicating the ratio of a specimen dimension to an image dimension be determined and stored together with the specified reproduction mode; and that for size calibration, a correction factor regarding the reproduction mode be derived by comparing the stored reproduction mode to the reproduction mode of the camera currently in use, and from that correction factor, together with the stored reference calibration value, the current calibration value be calculated.

15 Claims, 3 Drawing Sheets

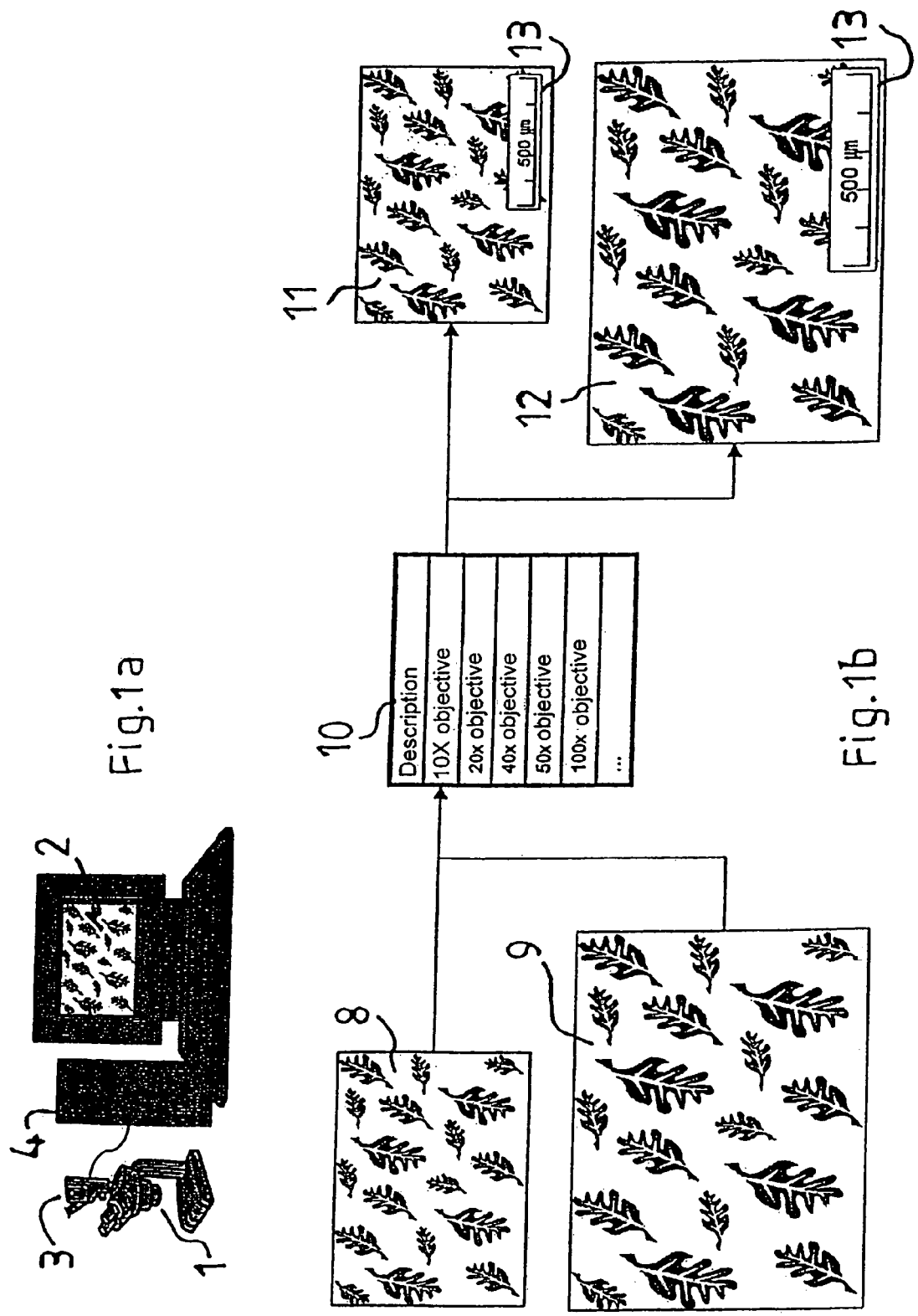

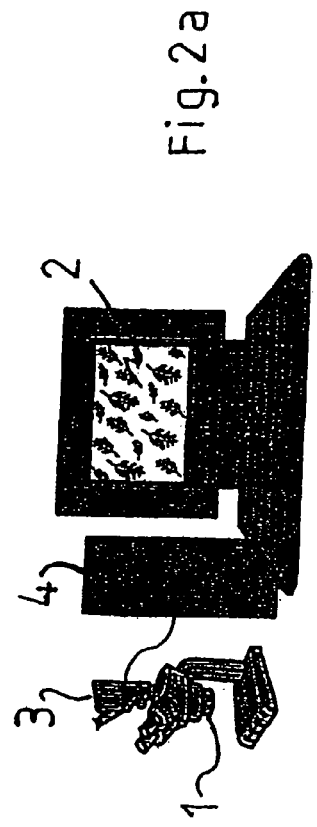
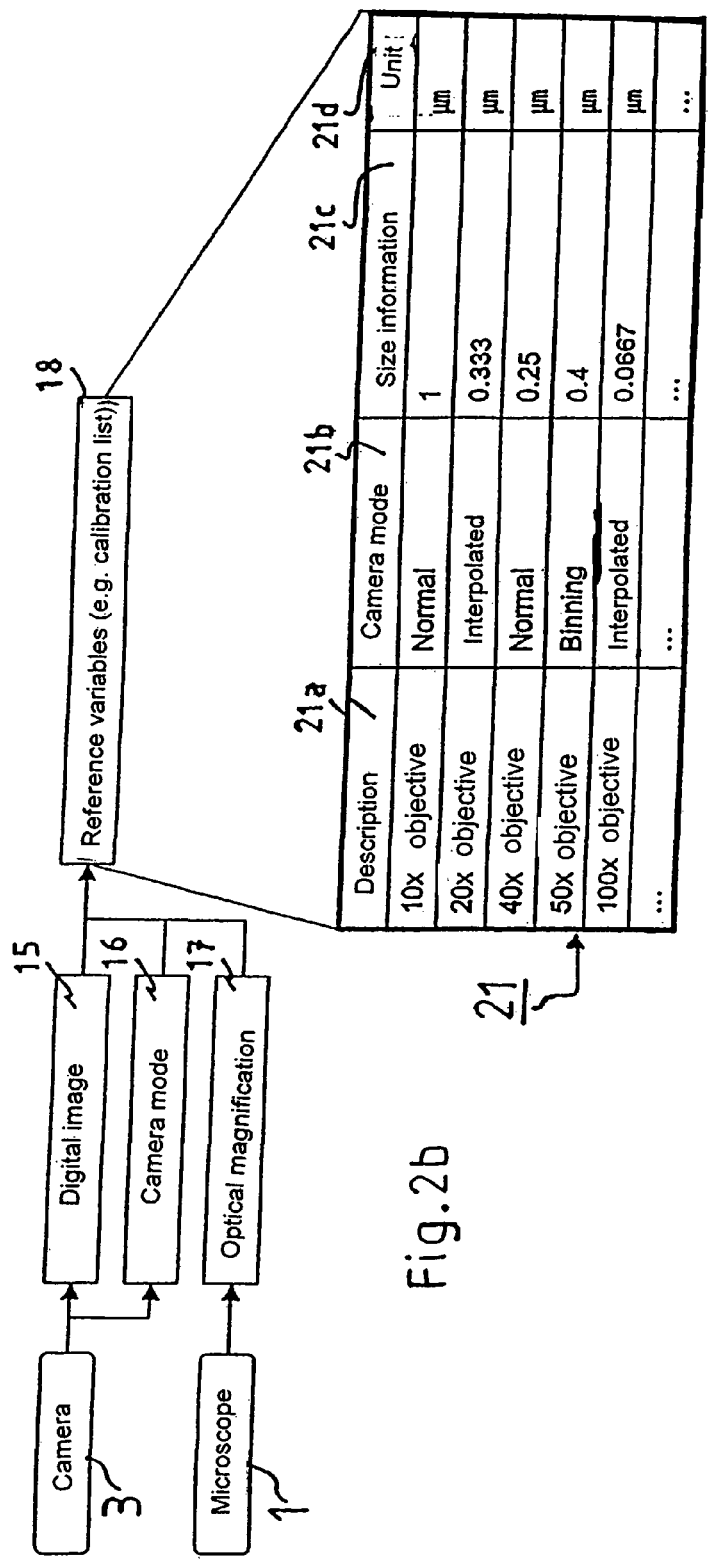
Fig. 2a
Fig. 2b

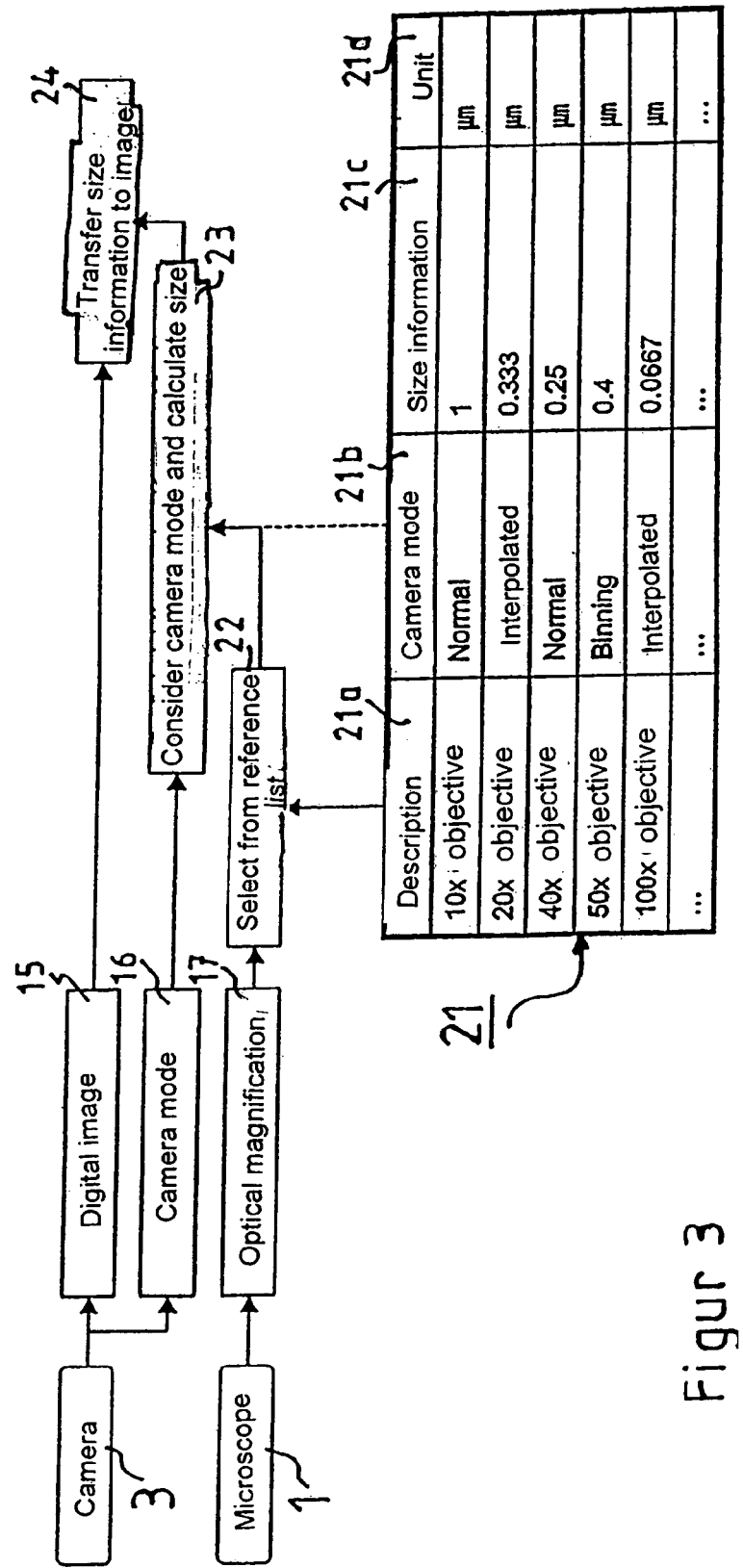
Figur 3

US 8,218,000 B2

METHOD AND SYSTEM FOR SIZE CALIBRATION

CROSS REFERENCE TO RELATED APPLICATIONS

The present application claims benefit under 35 U.S.C. §§120 and 365(c) as a continuation of International Application No. PCT/EP2003/010013 filed Sep. 9, 2003 designating the United States. The present application further claims benefit under 35 U.S.C. §§119 of German patent application no. 10242628.7 filed Sep. 13, 2002, priority of which is claimed in the aforementioned International Application No. PCT/EP2003/010013.

FIELD OF THE INVENTION

The present invention concerns a method for size calibration of an electronically generated image of a specimen that is generated by an optical instrument having a downstream digital camera operable in different reproduction modes. The invention further concerns a system for size calibration of an electronically generated image of a specimen, having an optical instrument for imaging the specimen; a digital camera, downstream from the optical instrument, for presenting the image, the camera possessing different reproduction modes; and calibration means for associating a specimen dimension with a selected image dimension. Lastly, the invention also concerns a computer program and a computer program product for carrying out the method according to the present invention on a computation unit.

BACKGROUND OF THE INVENTION

For the mensuration of imaged specimen structures, the dimensions of the specimen region in question are associated with a selected image region and are indicated or displayed. In the previous size calibration operation, for example in the case of a digital image, the length and height of a pixel are associated with the length and height of the corresponding specimen region. For measurement of a specimen structure, the latter is marked, the number of associated pixels is identified, and the dimension in the specimen plane is determined on the basis of the calibration value. This method is used in particular for the mensuration of microscopic structures; here, for example in the case of a microscope, for each optical magnification the specimen size corresponding to one pixel is stored e.g. in the form of a lookup table. For example, the pixel size (e.g. in the horizontal direction) is 1 µm in the specimen space at a 10× optical magnification, 0.5 µm at a 20× magnification, 0.25 µm at a 40× magnification, and so forth. If the pixel size in the horizontal direction differs from that in the vertical direction, the table entries need to be enhanced accordingly. For calibration of an image, the corresponding list entry is then selected in accordance with the selected image acquisition conditions (usually the particular optical magnification), in order to obtain the relevant pixel size, i.e. the current calibration value.

A number of methods are known for obtaining the appropriate calibration values in optical instruments having differing selectable magnifications.

In a first method, hereinafter called the list method, a micrometer specimen, for example a grating having a specific grating spacing, is introduced into the optical instrument, the optical magnification of the instrument being known. The micrometer specimen is imaged, and the corresponding image is displayed, for example, on a computer monitor. A distance (for example in the horizontal direction) is then marked on the image of the micrometer specimen, and the number of pixels within that distance is ascertained. From the ratio between the actual length of the distance (which is known for the micrometer specimen in question) and the number of pixels, the calibration value is then obtained for the selected or specified optical magnification of the instrument.

Unlike in the mathematical method explained below, in the list method the associated calibration value is then calculated for each possible setting of the optical instrument (typically, for each possible optical magnification), and stored in a list or lookup table. In contrast to this, in the mathematical method the calibration value stored for a specific optical magnification is also used for images acquired using a different optical magnification, by modifying the stored calibration value on the basis of the ratio between magnifications (stored reference magnification ratio and magnification currently in use).

Downstream from the optical instrument there is often a digital camera which further processes the image from the optical instrument, records it, and/or forwards it to a computer on whose monitor it is displayed to a user. Digital cameras can, however, usually be operated in different reproduction modes. There exists, for example, a "DC 100" digital camera of the Applicant having a normal reproduction mode (765× 581 pixels) and an interpolated reproduction mode (1146× 871 pixels), or e.g. the "DC 350 F" digital camera having a normal mode of 1300×1030 pixels and a binning mode of 650×515 pixels. The aforementioned size calibration methods are applicable in error-free fashion only if a digital camera is operated in exactly the reproduction mode in which the calibration took place. If operation is switched over into another mode, a size calibration must be performed again, since because of the change in number of pixels per image region, the previous calibration value would furnish incorrect results for mensuration.

It is usual, therefore, to generate and save a list having calibration values for every possible camera reproduction mode. Since there can be a large number of reproduction modes (e.g. Normal, Binning, Interpolated, Multi-Shot, etc.), the present method results in long lists, especially when each possible magnification of the optical instrument additionally needs to be taken into consideration. It has been found that generation of the lists (lookup tables), and access times to the table entries upon mensuration of a specimen, are time-intensive and moreover carry the risk that an incorrect camera mode will be selected from the list.

SUMMARY OF THE INVENTION

It is therefore the object of the invention to describe a method for size calibration that makes possible size mensuration of specimen regions that are imaged on an image display unit by an optical instrument and a downstream digital camera using different reproduction modes. The size calibration procedure is intended to supply, in a short time, reliable values for the different reproduction modes of the digital camera that make possible error-free specimen mensuration. The invention is further intended to make available a corresponding system for size calibration as well as a computer program (product) therefor.

This object is achieved, according to the present invention, in that firstly, for a specified reproduction mode, a reference calibration value is determined and is stored together with the specified reproduction mode, the reference calibration value indicating the ratio of a (known) specimen dimension to the corresponding image dimension; and that after this calibration operation, for size calibration, a correction factor regarding the reproduction mode is derived by means of a comparison of the stored reproduction mode to the reproduction mode currently in use, from which factor, together with the stored reference calibration value, the current calibration value is calculated.

According to the present invention, it is therefore sufficient to calibrate the camera system for an (arbitrary) specified reproduction mode; this reproduction mode that is used must be stored in the list. When a size mensuration is performed during operation, the current calibration value is calculated from the stored values. By comparison of the current reproduction mode to the stored reproduction mode, a correction factor is derived, from which, together with the stored reference calibration value, the current calibration value is then obtained.

The current reproduction mode of the camera can be inputted manually or ascertained automatically. In the latter case, the software responsible for size calibration can query the camera reproduction mode currently being used, or the digital camera transmits the current reproduction mode to the relevant software, which information is provided in signal form, i.e. as a digital signal.

The invention is usable at only a single magnification setting of the optical instruments, but also at different selectable optical magnification settings. It should be noted that the terms "magnification setting" or "magnification factors" of the optical instrument are representative of the different settings of the optical instrument. Since these various different usually affect the magnification of the optical instrument, however, the explanations below are limited to this case.

In an embodiment of the invention, it is combined with the aforementioned list method by the fact that for each magnification factor of the optical instrument, a respective reference calibration value is determined and stored. If the magnification setting of the optical instrument changes, the reference calibration value belonging to the associated magnification factor is identified in the stored list, the stored reproduction mode of the camera also being queried. Then, as already described above, by comparing the stored reproduction mode to the reproduction mode currently in use, a correction factor regarding the reproduction mode is derived, and from that, together with the stored reference calibration value, the current calibration value is calculated.

In a further advantageous embodiment, the invention is combined with the aforementioned mathematical method in that for an (arbitrary) specified magnification factor of the optical instrument, a reference calibration value is determined and is stored along with the specified magnification factor. According to the present invention, the list entry then consequently comprises three variables, namely the specified reproduction mode, the specified magnification factor, and the corresponding reference calibration value. The current size calibration is then performed by comparing the magnification factor currently in use to the stored magnification factor, and deriving a correction factor for the stored reference calibration value regarding the magnification factor. Then, by comparison of the camera reproduction mode currently in use to the stored reproduction mode, a correction factor regarding the reproduction mode is derived. From the two correction factors that are ascertained, together with the stored reference calibration value, the current calibration value is then calculated.

The reference calibration value refers a known specimen dimension to an image dimension on the image display unit. It is advantageous to indicate the image dimension as a number of pixels. If the pixel size in the horizontal direction should differ from that in the vertical direction, it is necessary to distinguish between these two directions. In this case different reference calibration values for the horizontal and the vertical direction can be ascertained and stored; or a calculation can be made, from a stored reference calibration value for one direction, of the corresponding reference calibration value for the other direction.

The correction factor used for the reference calibration value regarding the reproduction mode is advantageously the ratio between the number of pixels supplied by the digital camera in the specified stored reproduction mode and the number of pixels in the reproduction mode currently in use, within a predefined image region. In this case, the current calibration value can be calculated by simply multiplying the reference calibration value by the aforesaid correction factor. In the same fashion, the correction factor regarding the magnification factor of the optical instrument can be indicated as the ratio between the stored magnification factor and the magnification factor currently in use. In this case the current calibration value is easily calculated by multiplying the stored reference calibration value by the correction factor regarding the reproduction mode, and by the correction factor regarding the magnification factor.

As already mentioned above, the camera mode can be manually inputted or automatically determined for the size calibration currently being performed. The same is true of the magnification factor of the optical instrument currently in use.

A system for size calibration of an electronically generated image of a specimen comprises an optical instrument for imaging the specimen; a digital camera, downstream from the optical instrument and possessing different reproduction modes, for presenting the image, in which context a further display system can possibly be present (for example, a computer having a display monitor for further storage and processing of the images); and calibration means for associating a specimen measurement with a selected image dimension. Conventional calibration means are calibrated by means of a known specimen dimension, and then associate the corresponding specimen dimension with a selected image dimension. According to the present invention, the aforesaid system comprises a memory unit for prior storage of a reference calibration value that represents the ratio between specimen dimension and image dimension in a specified reproduction mode of the camera, the memory unit also storing the associated reproduction mode. Also provided is a calculation unit for calculating the current calibration value from the stored calibration value by means of a correction factor regarding the reproduction mode, that correction factor being derived from a comparison between the reproduction mode currently in use and the stored reproduction mode. The proposed memory and computation unit thus make it possible to implement the method according to the present invention for size calibration.

If the aforementioned system comprises an optical instrument that is operable with different magnification factors, the memory unit is advantageously designed for prior storage of reference calibration values for each possible magnification factor of the optical instrument.

Alternatively, in this case the memory unit can be designed for prior storage of a first reference calibration value for a specified magnification factor of the optical instrument, and for storage of that magnification factor; and the computation unit can be designed for calculating a correction factor regarding the magnification factor, that correction factor being determined by comparing the current magnification factor to the stored magnification factor, that correction factor being taken into consideration, in addition to the correction factor regarding the reproduction mode, as a further correction factor in calculating the current calibration value.

The optical instrument comprises a microscope or a macroscope, in particular having an adjustable optical magnification (e.g. also having a magnification changer such as a zoom).

It is advantageous to provide means that transmit the reproduction mode and/or magnification factor currently in use to the computation unit of the system, or that make possible a query by the computation unit as to the reproduction mode and/or magnification factor currently in use.

The method according to the present invention can usefully be carried out by means of a computer program that is executed on a suitable computation unit. In the simplest case, the necessary calculations can be limited to the calculation operations of division and multiplication. Advantageously, the computer program is executed on the aforementioned calculation unit of the system according to the present invention. The computer program can be stored on suitable data media such as EEPROMs or flash memories, but also on CD-ROMs, diskettes, or hard drives. The computer program accesses the stored data, namely the stored reproduction mode and the correspondingly stored reference calibration value, ascertains the current reproduction mode of the camera, and then calculates therefrom the current calibration value. In the manner already described, the computer program can additionally take into consideration different magnification factors of the optical instrument.

BRIEF DESCRIPTION OF THE DRAWING FIGURES

An exemplary embodiment below is intended to explain the invention and its advantages in more detail, with reference to the attached drawings in which:

FIG. 1a schematically shows a system for image acquisition and for size calibration and image analysis;

FIG. 1b shows an example of a known procedure for mensuration of specimen structures according to the prior art;

FIG. 2a schematically shows a system for image acquisition and for size calibration and image analysis in accordance with an embodiment of the present invention;

FIG. 2b shows a first step of a method for size calibration according to an embodiment of the the present invention for image analysis and size mensuration; and FIG. 3 shows a second step of the size calibration method.

DETAILED DESCRIPTION OF THE INVENTION

FIG. 1a schematically shows a system for size calibration of image regions of an electronically generated image of a specimen that, in this exemplary embodiment, is displayed on monitor 2 of a computer 4. The system further comprises an optical instrument, here a microscope 1, for imaging the specimen, as well as a downstream digital camera 3. Camera 3 supplies individual images or image sequences to computer 4, which temporarily stores those images in order to display them on monitor 2. Computer 4 can be used in ordinary fashion for storing and/or processing the images. The system depicted serves to display and measure specimen structures that are detectable only by using a microscope.

FIG. 1b shows the example of an image analysis by size mensuration. For that purpose, in this example images 11 and 12 have overlaid on them, by superimposition, a scale 13 that indicates the size relationships in the specimen space, i.e. on the specimen itself. For real-time size mensuration, the specimen structure to be measured is often marked by means of a pointing instrument (mouse), and the result of the size mensuration is then displayed. Images 11 and 12 are associated with the original images 8 and 9, respectively, the latter images having been acquired in different reproduction modes of camera 3. For example, image 8 was acquired in the 764×581-pixel reproduction mode, and image 9 in the 1146×871-pixel mode. To allow the measurement to be performed without error, the calibration value must be adapted in accordance with the reproduction mode of camera 3. In this example, this is evident from the change in the size of scale 13.

In the present example, camera 3 possesses two different reproduction modes, and the microscope possesses different optical magnification settings (10×, 20×, 40×, 50×, 100×, etc.). Hitherto, for each magnification factor and for each reproduction mode of camera 3, the corresponding calibration value (or scaling factor) had to be taken from a table 10. The calibration values are usually obtained by imaging a micrometer specimen having known dimensions, and then associating a known object dimension with the corresponding image dimension. This calibration procedure must therefore be performed for each reproduction mode and for each optical magnification, which is laborious. In addition, for image analysis a large table 10 must be searched in order to obtain the correct calibration value/scaling factor. This method is time-consuming, and the possibility exists of accessing incorrect table entries.

FIG. 2 now shows a system according to the present invention for size calibration and image analysis, identical reference characters indicating identical system elements. Computer 4 of the system according to the present invention comprises a memory unit for prior storage of a reference calibration value 21c and its unit 21d (see FIG. 2b), which represents the ratio between specimen dimension and image dimension in a specified reproduction mode 21b of camera 3, and for storage of the associated reproduction mode 21b. This storage can be accomplished in the form of a table 21 depicted in FIG. 2b. The system according to the present invention furthermore comprises a computation unit for calculating the current calibration value from the stored reference calibration value 21c, 21d.

Camera 3 used in this exemplary embodiment possesses different reproduction modes 21b, which are labeled in table 21 as "Normal," "Interpolated," and "Binning." Microscope 1 that is used can be operated with different optical magnification settings, which are reproduced in table 21 in column 21a. The memory unit of the system according to the present invention is designed in such a way that for a specified reproduction mode 21b and a specified magnification factor 21a, a respective reference calibration value 21c, 21d is stored in the form of a table 21. This first step (calibration) of the calibration method is performed, for example, in conventional fashion by means of a micrometer specimen having a known dimension. According to the present invention, however, reproduction mode 21b of camera 3 is then also acquired and stored. For that purpose, camera 3 supplies digital image 15 as well as the respective reproduction mode 16, while microscope 1 forwards magnification factor 17 as information. In a context of square pixels (i.e. as high as they are long), a specimen sector of known dimension is then marked on digital image 15, the number of associated pixels of the digital camera is sensed, and the corresponding reference calibration value is calculated. This value, calculated in step 18, indicates e.g. the size in the specimen space corresponding to one pixel width/height. The result of step 18 is table 21 as depicted. In this example, a reference calibration value, subdivided into a numerical value 21c and the associated unit 21d, is listed for each magnification factor 21 and a specific camera reproduction mode 21b.

The procedure for size mensuration in the context of an image analysis operation will now be described with reference to FIG. 3.

For this, digital camera 3 also supplies, in addition to digital image 15, information about the current reproduction mode 16. Microscope 1 supplies information about the current magnification factor 17. These items of information either can be delivered actively to the computation unit of the system, or are queried by that computation unit. In step 22, based on the information about optical magnification, the corresponding line in table 21 that contains the relevant magnification factor 21a is selected. In step 23, the stored reproduction mode 21b of camera 3 is queried and is compared to reproduction mode 16 of camera 3 that is currently in use. At the same time, the stored reference calibration value 21c, 21d is read from the relevant line of table 21. By comparing the stored reproduction mode 21b to reproduction mode 16 currently in use, a correction factor is calculated, and from that the current correct calibration value is obtained.

The calculation factor is easily calculated by determining the ratio between the number of pixels in the stored reproduction mode 21b and the number of pixels in reproduction mode 16 currently in use, referred to a specified image region. The stored reference calibration value 21c, 21d is then multiplied by this correction factor to yield the current calibration value.

For size measurement of a specimen structure, a specific region is then marked on screen 2 and, by means of the calibration value that has been ascertained, the size of the marked region is calculated and, if applicable, displayed (step 24). Alongside or additionally, a scale 13 can also be superimposed as depicted in FIG. 1b.

The present invention allows error-free size mensuration in the context of image acquisition using a digital camera that possesses different reproduction modes. The memory requirement can be minimized, so that both preparation of the data to be stored, and access to the stored data, require little time. At the same time, image analysis reliability is increased.

| | PARTS LIST |
|---|---|
| 1 | Optical instrument/Microscope |
| 2 | Monitor |
| 3 | Digital camera |
| 4 | Computer |
| 8 | Image generated in first camera reproduction mode |
| 9 | Image generated in second camera reproduction mode |
| 10 | Table with calibration values |
| 11 | Image 8 after size calibration |
| 12 | Image 9 after size calibration |
| 13 | Scale |
| 15 | Digital image |
| 16 | Reproduction mode currently in use |
| 17 | Magnification factor of microscope |
| 18 | Step for determining reference variables |
| 21 | Table |
| 21a | Stored magnification factor of microscope |
| 21b | Stored reproduction mode of camera |
| 21c | Reference calibration value (numerical variable) |
| 21d | Unit of reference calibration value |
| 22 | Step of selecting from reference list |
| 23 | Step of calculating current calibration value |
| 24 | Step of image size calibration |

What is claimed is:

1. A method for size calibration of an electronically generated image of a specimen, wherein the image is generated by a digital camera coupled to an optical instrument imaging the specimen in a single plane and operable in at least three reproduction modes, the method comprising the steps of:
   A) specifying only a single reproduction mode of the camera;
   B) determining only a single reference calibration value consisting solely of a ratio of said specimen dimension to an image dimension for the single specified reproduction mode for a given magnification setting of the optical instrument;
   C) storing the single reference calibration value in association with the single specified reproduction mode;
   D) comparing the single specified reproduction mode to a reproduction mode chosen from the at least three reproduction modes to derive a reproduction mode correction factor; and
   E) calculating a calibration value applicable to the chosen reproduction mode from the single reference calibration value and the reproduction mode correction factor, wherein the calibration value applicable to the chosen reproduction mode consists solely of the single reference calibration value multiplied by the reproduction mode correction factor for the given magnification setting;
   wherein steps (D) and (E) are applied regardless of which of the at least three reproduction modes is chosen,
   wherein the optical instrument is operable at a plurality of different magnification settings, and a respective said single reference calibration value is determined in accordance with step (B) and stored for each of the plurality of magnification settings, and for a specified magnification setting of the optical instrument, the single reference calibration value is determined and stored in association with the specified magnification setting; and a chosen magnification setting is compared to the specified magnification setting to derive a magnification setting correction factor, whereby a calibration value applicable to the chosen reproduction mode and chosen magnification setting can be calculated by multiplying the single reference calibration value by the reproduction mode correction factor and the magnification setting correction factor.

2. The method as defined in claim 1, wherein the number of pixels of the digital camera in one direction is used as the image dimension.

3. The method as defined in claim 2, wherein a ratio between the number of pixels in the specified reproduction mode and the number of pixels in the chosen reproduction mode, within a predefined image region, is used as the reproduction mode correction factor.

4. The method as defined in claim 1, wherein the optical instrument is a microscope.

5. The method as defined in claim 1, wherein the optical instrument is a macroscope.

6. The method as defined in claim 1, wherein the chosen reproduction mode is inputted manually.

7. The method as defined in claim 1, wherein the chosen reproduction mode is inputted automatically.

8. The method as defined in claim 1, wherein the chosen magnification setting is inputted manually.

9. The method as defined in claim 1, wherein the chosen magnification setting is inputted automatically.

10. A system for size calibration of an electronically generated image of a specimen, the system comprising:
   an optical instrument for imaging the specimen in a single plane;

a digital camera downstream from the optical instrument for detecting an optical image of the specimen and electronically generating a digital image of the specimen, the digital camera having at least three reproduction modes;

a memory unit storing a single reference calibration value consisting solely of a ratio between said specimen dimension and image dimension in only a single specified reproduction mode of the digital camera for a given magnification setting of the optical instrument, and storing the single specified reproduction mode in association with the stored single reference calibration value; and a calculation unit for comparing the single specified reproduction mode to a reproduction mode chosen from the at least three reproduction modes, regardless of which of the at least three reproduction modes is chosen, to derive a reproduction mode correction factor, and calculating a calibration value applicable to the chosen reproduction mode from the single reference calibration value and the reproduction mode correction factor, wherein the calibration value applicable to the chosen reproduction mode consists solely of the single reference calibration value multiplied by the reproduction mode correction factor for the given magnification setting, wherein the optical instrument is operable at a plurality of different magnification settings, and the memory unit stores a respective said single reference calibration value for each of the plurality of settings, and for a specified magnification setting of the optical instrument, the single reference calibration value is stored by the memory unit in association with the specified magnification setting; and the calculation unit compares a chosen magnification setting to the specified magnification setting to derive a magnification setting correction factor, whereby a calibration value applicable to the chosen reproduction mode and chosen magnification setting can be calculated by multiplying the single reference calibration value by the reproduction mode correction factor and the magnification setting correction factor.

11. The system as defined in claim 10, wherein the optical instrument is a microscope.

12. The system as defined in claim 10, wherein the optical instrument is a macroscope.

13. The system as defined in claim 10, wherein the digital camera provides a signal to the calculation unit, the signal being indicative of the chosen reproduction mode of the digital camera.

14. The system as defined in claim 10, wherein the optical instrument provides a signal to the calculation unit, the signal being indicative of the chosen magnification setting of the optical instrument.

15. A computer program product comprising a memory medium having machine executable instructions for carrying out the steps of claim 1.

* * * * *